US007455440B2

(12) United States Patent
Nishizawa

(10) Patent No.: US 7,455,440 B2
(45) Date of Patent: Nov. 25, 2008

(54) ELECTRONIC DEVICE, PANEL STRUCTURE THEREOF AND METHOD OF MOUNTING INDICATOR THEREIN

(75) Inventor: Kazuhiko Nishizawa, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 148 days.

(21) Appl. No.: 10/663,861

(22) Filed: Sep. 16, 2003

(65) Prior Publication Data

US 2004/0090342 A1 May 13, 2004
US 2005/0068189 A9 Mar. 31, 2005

(30) Foreign Application Priority Data

Sep. 17, 2002 (JP) ............................. 2002-270560

(51) Int. Cl.
*F21V 17/16* (2006.01)
*F21V 8/00* (2006.01)
*G02B 6/36* (2006.01)
*G02B 6/46* (2006.01)

(52) U.S. Cl. ........................ 362/581; 362/559; 362/582

(58) Field of Classification Search ................. 362/555, 362/551, 27, 85, 800, 26, 581, 582, 489, 362/559, 576; 340/815.42, 815.43, 815.45; 40/547

See application file for complete search history.

(56) References Cited

U.S. PATENT DOCUMENTS

| | | | | | |
|---|---|---|---|---|---|
| 2,374,408 | A | * | 4/1945 | Braidwood | 340/815.43 |
| 4,213,323 | A | * | 7/1980 | De Deugd | 72/358 |
| 4,310,974 | A | * | 1/1982 | Gdovin et al. | 340/815.42 |
| 4,504,830 | A | * | 3/1985 | Boehme | 340/815.42 |
| 4,600,975 | A | * | 7/1986 | Roberts | 362/147 |
| 4,800,466 | A | * | 1/1989 | Bauer et al. | 362/26 |
| 4,917,448 | A | * | 4/1990 | Oppenheimer | 385/116 |
| 5,268,823 | A | * | 12/1993 | Yergenson | 362/555 |
| 5,387,901 | A | * | 2/1995 | Hardt | 340/815.42 |
| 5,398,170 | A | * | 3/1995 | Lee | 362/559 |
| 5,481,440 | A | * | 1/1996 | Oldham et al. | 362/555 |
| 5,938,324 | A | * | 8/1999 | Salmon et al. | 362/555 |

(Continued)

FOREIGN PATENT DOCUMENTS

| | | | | | |
|---|---|---|---|---|---|
| JP | 61133909 | A | * | 6/1986 | 385/60 |

(Continued)

OTHER PUBLICATIONS

Chinese Patent Office Action submitted in relation to application No. 03124945.0, Aug. 19, 2005.

*Primary Examiner*—Alan Cariaso
(74) *Attorney, Agent, or Firm*—Morrison & Foerster LLP

(57) ABSTRACT

A panel of an electronic device on which an indicator is mounted is provided with an insertion hole therethrough. The indicator is composed of a light guide with one end surface exposed to a front surface side of the panel and another end surface projecting to a rear surface side of the panel, through the insertion hole, and a light emitting unit provided on the rear surface side of the panel such that a light emitting portion thereof is opposed to the other end surface of the light guide. Further, the light guide is composed of a light transmitting elastic body having a uniform cross section, and fixed by an outer peripheral surface thereof near the one end surface being in pressure contact with an inner peripheral surface of the insertion hole.

13 Claims, 6 Drawing Sheets

U.S. PATENT DOCUMENTS 5,982,969 A * 11/1999 Sugiyama et al. ........... 385/123
6,195,016 B1 * 2/2001 Shankle et al. ......... 340/815.42
6,234,657 B1 * 5/2001 Shih ........................... 362/559
6,353,185 B1 * 3/2002 Sakata ........................ 174/668
6,499,191 B1 * 12/2002 Howie, Jr. .................... 16/441
6,685,351 B2 * 2/2004 Chen .......................... 362/555
6,700,194 B2 * 3/2004 Nakajima et al. ........... 257/707

FOREIGN PATENT DOCUMENTS

JP 4-12538 3/1992

* cited by examiner

ELECTRONIC DEVICE, PANEL STRUCTURE THEREOF AND METHOD OF MOUNTING INDICATOR THEREIN

BACKGROUND OF THE INVENTION

1. Field of the Invention

The present invention relates to an electronic device provided with a light emitting indicator, a panel structure thereof, and a method of mounting the indicator in the electronic device.

2. Description of the Related Art

Currently, electronic devices include light emitting indicators provided on their panels and turn them on/off to display their various operating states, setting states, or selecting states such as ON/OFF of power sources, occurrence/non-occurrence of abnormal situations, press/non-press of operation buttons, and so on.

This indicator is referred also to as an indicator light, display for indication, or pilot lamp.

For a light emitting unit of such a light emitting indicator, a light emitting diode (LED) is often used.

As shown in FIG. 8, an LED 101 is composed of a light emitting portion 111 that is a lens made of a transparent resin with a semiconductor element embedded therein and two terminals 112 and 113 that are an anode lead and a cathode lead for applying voltage to the semiconductor element. Typically, on a rear surface 103*b* side of a panel 103, a circuit board 104 is placed parallel to the panel 103 with a space intervening therebetween, the terminals 112 and 113 of the LED 101 are inserted into through holes 141 in the circuit board 104 and soldered, and the light emitting portion 111 is provided in such a manner to pass through a through hole 131 provided in the panel 103 and slightly project above from a front surface 103*a* of the panel 103.

In this case, however, when the space between the panel 103 and circuit board 104 is increased, the terminals 112 and 113 need to be made longer, and as a result, the light emitting portion 111 becomes unstable to easily move upward and downward. The light emitting portion 111 is therefore bonded and fixed to the panel 103 with an adhesive or the like, leading to a marred appearance of the electronic device due to the adhesive running over.

Accordingly, it has been conventionally implemented that a spacer 102 is provided around the terminals 112 and 113 and fixed at the circuit board 104 to support the light emitting portion 111 as shown in FIG. 9. In this case, the spacer 102 cannot be seen from the front surface 103*a* side of the panel 103, without marring the appearance of the electronic device.

Further, as shown in FIG. 10, there also is a light indicator which is composed of an LED 101 being a light emitting unit, a plastic dome-shaped molded lens 105 with a convex lens portion 105*a* provided at the center of its upper end surface, and a guide 106.

In this case, a light emitting portion 111 of the LED 101 is mounted to come into contact with a circuit board 104 and covered with the molded lens 105, and the convex lens portion 105*a* is provided in such a manner to pass through a through hole 131 and slightly project above from a front surface 103 a of a panel 103. Accordingly, the light emitting portion 111 of the LED 101 can be fixed without marring the appearance of the electronic device.

It should be noted that light emitted by the light emitting portion 111 of the LED 101 is conducted to the front surface of the panel 103 via the convex lens portion 105*a* of the molded lens 105. Besides, the guide 106 is a member for positioning the molded lens 105 when it is mounted.

In the case shown in FIG. 9, however, it is necessary to align, through fine adjustment, the position of the through hole 131 provided in the panel 103 with the positions of the LED 101 and spacer 102 in three directions (two horizontal and one vertical directions). Therefore, assembly which should be performed with high accuracy increases the number of steps, leading to a problem that cost is increased.

On the other hand, in the case shown in FIG. 10, a mold is required to produce the molded lens 105, and it is also necessary to change the shape of the molded lens 105 in accordance with the space and angle between the panel 103 and the circuit board 104, leading to a problem that the cost is increased. In particular, when a plurality of indicators are installed in an electronic device whose panel 103 and circuit board 104 are not parallel to each other, many kinds of molded lenses 105 are required, resulting in very high cost.

Further, positioning guides 106 are required to install the molded lenses 105, presenting a problem that not only the structure becomes complex because of the increased number of indicators but also their mounting steps become complicated.

SUMMARY OF THE INVENTION

The present invention is made in view of the above-described problems, and an object of the invention is to simplify the structure of an indicator without marring an appearance of an electronic device and also simplify its mounting steps so as to be able to easily mount many light emitting indicators with sufficient mounting accuracy.

An electronic device according to the invention comprises an indicator and, in order to attain the above object, includes a panel on which the indicator is mounted and an insertion hole provided through the panel.

The indicator comprises a light guide with one end surface exposed to a front surface of the panel and another end surface projecting to a rear surface side of the panel, through the insertion hole, and a light emitting unit provided on the rear surface side of the panel such that a light emitting portion thereof is opposed to the other end surface of the light guide.

Further, the light guide is composed of a light transmitting elastic body having a uniform cross section, and fixed by an outer peripheral surface thereof near the one end surface being in pressure contact with an inner peripheral surface of the insertion hole.

Besides, a method of mounting an indicator in electronic device according to the invention includes the following steps:

a first step of forming an insertion hole through a panel of the electronic device;

a second step of placing a light emitting unit at a position apart from the insertion hole on a rear surface side of the panel by a predetermined length such that a light emitting portion thereof is opposed to the insertion hole;

a third step of cutting a long light transmitting elastic body, which is formed to have a uniform shape of a cross section perpendicular to an axial direction thereof, in a predetermined length along a cross section perpendicular or oblique to the axial direction to form a light guide chip; and a fourth step of pressing the light guide chip into the insertion hole from the front surface side of the panel.

Then, the first to fourth steps are performed in any step order of (1) to (5) as follows:

(1) an order of the first, second, third, and fourth steps, (2) an order of the first, third, second, and fourth steps, (3) an order of the first, third, fourth, and second steps, (4) an order of the third, first, second, and fourth steps, and (5) an order of the third, first, fourth, and second steps.

Further, in a panel structure of an electronic device according to the invention, an insertion hole is formed through a panel of the electronic device, and a light emitting unit is placed on a rear surface side of the panel at a position apart from the insertion hole by a predetermined length such that a light emitting portion thereof is opposed to the insertion hole.

Then, a light guide composed of a light transmitting elastic body, which is formed to have a uniform shape of a cross section perpendicular to an axial direction thereof, is inserted into the insertion hole from the front surface side of the panel and frictionally held by the insertion hole.

The light guide is made by cutting a long light transmitting elastic body in a predetermined length along a cross section perpendicular or oblique to the axial direction into a chip form.

It is preferable that the insertion hole in the electronic device is formed by performing burring for the panel from the front surface side thereof to the rear surface side, and holding of the light guide in the panel is implemented by the insertion hole having a contact area increased by the performance of the burring.

Further, the length of the light guide is preferably set shorter than a distance from the front surface of the panel to a top portion of the light emitting unit by a clearance for preventing the light guide from abutting against the light emitting unit.

Further, it is more preferable that the end surface of the light guide on the front surface side of the panel is a rough surface having roughness (minute projections and depressions), because light from the light emitting unit is scattered to be easily viewed. It should be noted that the rough surface is naturally produced on the cross section by cutting by a cutter. In short, a cross section produced in other than mirror processing must provide a light scattering effect.

Therefore, in the method of mounting an indicator in an electronic device, it is preferable that at least one of the end surfaces of the light guide chip is formed into a rough surface in the third step, and the light guide chip is pressed into the insertion hole such that the end surface formed into the rough surface is exposed to the front surface side of the panel in the fourth step.

Beside, in the panel structure of the electronic device, it is possible that the insertion hole is formed by performing burring for the panel from the front surface side thereof to the rear surface side.

Then, it is preferable that holding of the light guide in the panel is implemented by the insertion hole having a contact area increased by the performance of the burring.

It is desirable that the length of the light guide is set shorter than a distance from the front surface of the panel to a top portion of the light emitting unit by a clearance for preventing the light guide from abutting against the light emitting unit.

The clearance preferably has a dimension which absorbs a cutting error occurring when the long light transmitting elastic body is cut in a predetermined length to be formed into the chip form.

Further, the end surface of the light guide on the front surface side of the panel formed into a rough surface scatters light from the light emitting unit, resulting in improved visibility.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, preferred embodiments of the invention will be described with reference to the drawings.

Figure 7:
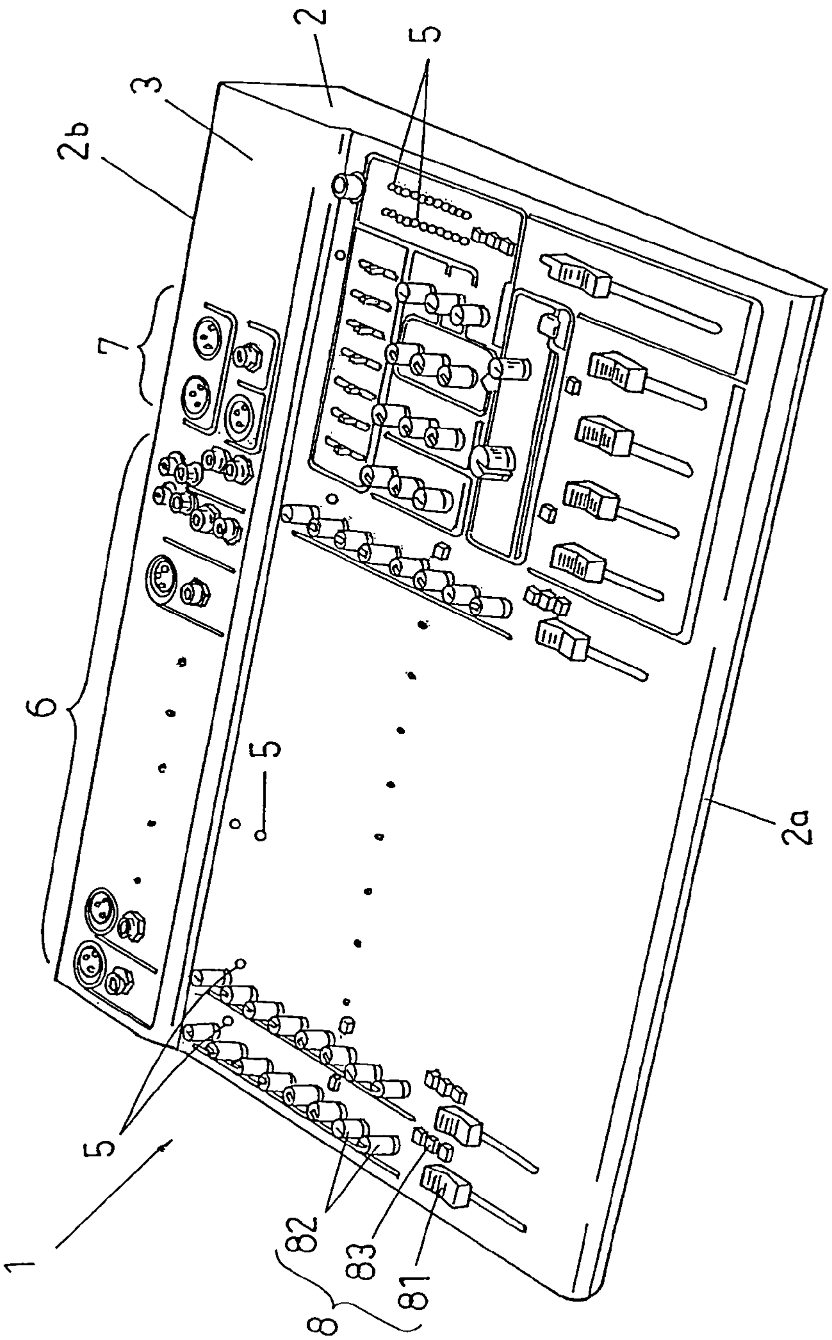
FIG. 7 is a perspective view of a mixer showing an embodiment of an electronic device according to the invention.
Figure 8:
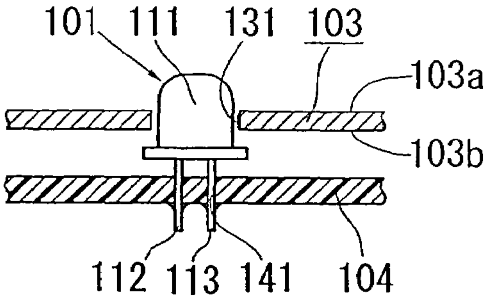
FIG. 8 PRIOR ART
FIG. 8 is an enlarged cross-sectional view showing a panel structure and an indicator mounting portion of a conventional electronic device.
Figure 9:
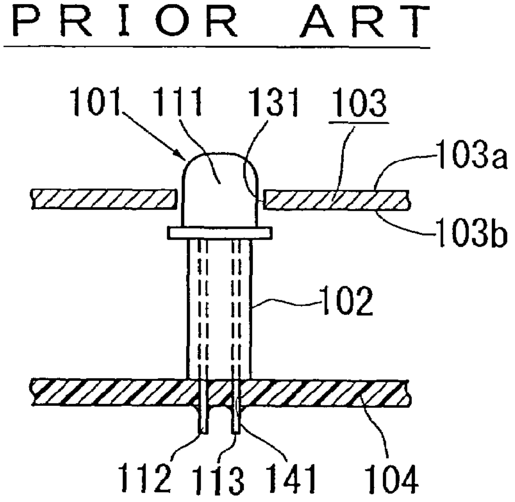
FIG. 9 PRIOR ART
FIG. 9 is an enlarged cross-sectional view showing an indicator mounting portion using a spacer of a conventional electronic device.
Figure 10:
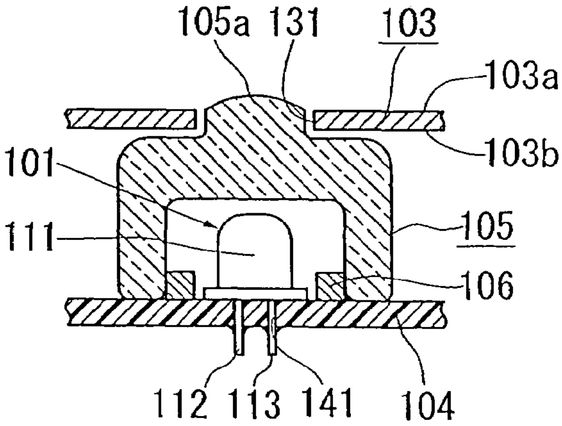
FIG. 10 PRIOR ART
FIG. 10 is an enlarged cross-sectional view showing an indicator mounting portion using a molded lens of a conventional electronic device.

FIG. 7 is a perspective view of a mixer showing an embodiment of an electronic device according to the invention with light emitting indicators mounted therein. It should be noted that although component groups, as in two rows shown in detail on the left side of a mixer 1, are actually provided in several rows at regular intervals to the component group shown at an almost middle portion, their illustrations are omitted and represented by "..." to prevent complexity of the drawing.

The mixer represents an electronic device for acoustic control in theaters, halls, outdoors, and so on, or for mixing and controlling a plurality of audio signals used for creating sound for recording and so on, and can mix audio signals inputted from a plurality of channels at arbitrary level (volume) ratio and output them. Typically, the mixer is also equipped with effect circuits such as equalizers, effectors, and so on for processing tones of audio signals, and input/output terminals.

The mixer 1 shown in FIG. 7 has a dustpan-shaped case 2 which has a small height dimension as compared to length and width dimensions and which has a height of a front surface side (a front side) 2*a* smaller than the height of a rear surface side (a rear side) 2*b*, a circuit board with circuits for implementing the above-described functions mounted thereon is provided in the case 2, and a panel 3 is covered on the upper end surface of the case 2. Accordingly, the panel 3 is not parallel to the bottom surface of the case 2 but is inclined downward to the front side 2*a*.

Further, the panel 3 is provided with indicators 5, input terminals 6, output terminals 7, many various controls 8 such as slide volume knobs 81, rotary volume knobs 82, and switch buttons 83, and so on.

In the mixer 1, the plurality of input terminals 6 are connected to sound sources such as electronic musical instruments and microphones via not-shown wirings respectively to input a plurality of audio signals. Then, after modifying or mixing their volumes and tones in accordance with operation of the plurality of controls 8 by an operator, the mixer 1 outputs them from the output terminals 7 to connected amplifiers, speakers, and headphones or recording devices via not-shown connecting lines.

The indicators 5 are configured to display various operation states (operating state, setting state, selecting state, and so on) of the mixer 1 through their lighting/non-lighting for the operator to easily view. Next, the indicator 5 is described in detail.

Figure 1:
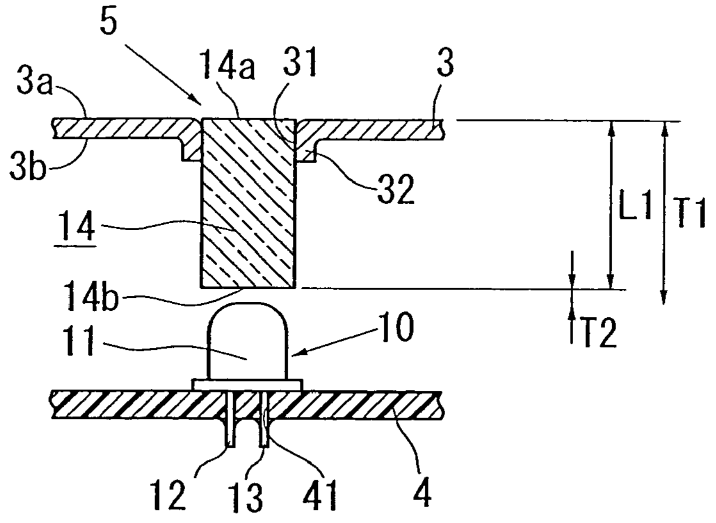
FIG. 1 is a cross-sectional view of a first embodiment showing an enlarged panel structure and indicator mounting portion of a mixer shown in FIG. 7 being an example of an electronic device to which the invention is applied.

FIG. 1 is a cross-sectional view of a first embodiment showing an enlarged cross section of a panel structure and an indicator mounting portion of a mixer 1 being an electronic device made by embodying the invention.

In the first embodiment, an insertion hole 31 is provided through a panel 3 made of a sheet metal, and its inner peripheral portion is burred to form a burring portion 32 (a falling portion around the hole) projecting to a rear surface 3*b* side of the panel 3.

The burring portion 32 has a cylindrical flange around the hole. The burring portion 32 is made by preliminarily forming a hole in the sheet metal and partially stretching the sheet metal so that the cylindrical flange is formed.

Then, a light guide chip 14 is inserted into the insertion hole 31 and, in a state that an upper end surface 14*a* being one end surface of the light guide chip 14 is exposed to a front surface 3*a* side of the panel 3 through the insertion hole 31, and a lower end surface 14*b* being the other surface is projected from the rear surface 3*b* of the panel 3, a peripheral surface of the light guide chip 14 near the upper end surface 14*a* is in pressure contact with and fixed to an inner peripheral surface of the burring portion 32 forming the insertion hole 31. The light guide chip 14 will be described later in detail.

On the other hand, a circuit board 4 is provided, on the rear surface 3*b* side of the panel 3, spaced from the panel 3, and a light emitting unit 10 is mounted thereon. The light emitting unit 10 is an LED similar to the conventional light emitting unit 101, its light emitting portion 11 is placed to face the lower end surface 14*b* of the light guide chip 14, and its terminals 12 and 13 are inserted into through holes 41 of the circuit board 4 and soldered.

It should be noted that the indicator 5 is composed of the light guide chip 14 and light emitting unit 10, and the light guide chip 14 efficiently conducts light emitted by the light emitting portion 11 of the light emitting unit 10 from the lower end surface 14*b* to the upper end surface 14*a* exposed to the front surface side of the panel 3, so that an operator can clearly recognize its lighting/non-lighting.

Next, the light guide chip 14 is described. The light guide chip 14 is composed of a light transmitting elastic body made of a transparent elastic resin or the like having a uniform cross-sectional shape.

A length L1 of the light guide chip 14 is set shorter than a distance T1 from the front surface of the panel 3 to the upper end of the light emitting unit 10 only by a clearance T2 for absorbing a cutting error of the light guide chip 14 and/or a height error in mounting the light emitting unit 10 to prevent the light guide chip 14 from abutting against the light emitting unit 10. Therefore, L1=T1−T2. The clearance T2 is the distance for preventing the length L1 of the light guide chip 14 from being greater than the distance T1 and resulting in incapability of mounting the light guide chip 14 even when the above error is maximum, and it is preferably set to about 1 mm. However, it is not limited to 1 mm, but can be an optimal distance in accordance with the processing accuracy and assembly accuracy of components.

When the light guide chip 14 is a light guide chip formed by cutting a long light transmitting elastic body in a predetermined length as described later, its clearance T2 is preferably set to a dimension by which a cutting error occurring while cutting is absorbed.

Although not shown in the drawing, both the end surfaces 14*a* and 14*b* of the light guide chip 14 are rough surfaces having roughness (minute projections and depressions). If the upper end surface 14*a* of the light guide chip 14 being the end surface on the front surface side of the panel 3 is a rough surface, the upper end surface 14*a* scatters light from the light emitting unit 10, so that the operator can easily view its lighting/non-lighting from any direction. Besides, if the lower end surface 14*b* being the other end surface is a rough surface, the light guide chip 14 can sufficiently receive the light from the light emitting unit even if the mounting positions of the light emitting unit 10 and light guide chip 14 are displaced from each other, and therefore the positional adjustment becomes unnecessary.

It should be noted that these rough surfaces are naturally produced through cutting the light transmitting elastic body by a cutter as described later. However, the end surfaces 14*a* and 14*b* of the light guide chip 14 are not limited to the rough surfaces. For example, the upper end surface 14*a* may be ground into a spherical shape if it is desired to enhance the directivity of the light from the indicator.

Figure 2:
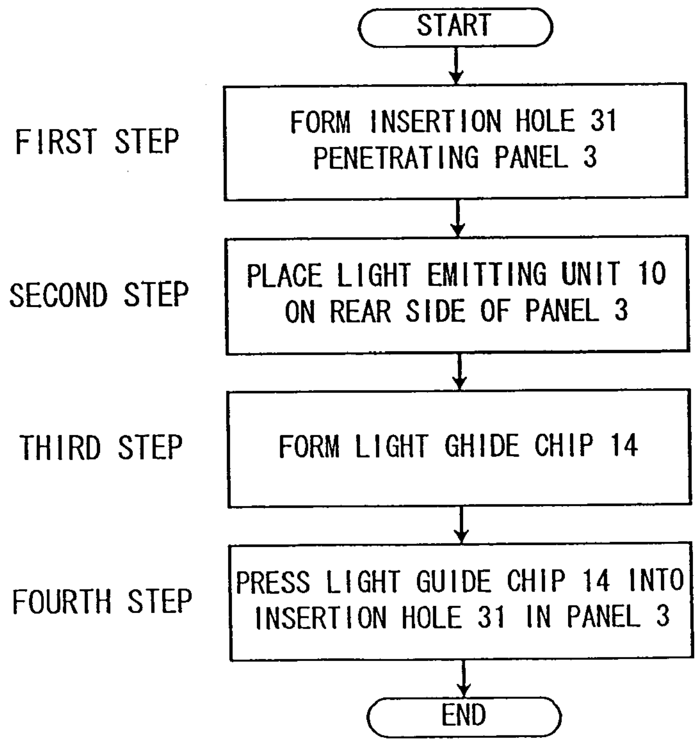
FIG. 2 is a flowchart showing respective steps of a method of mounting an indicator of the electronic device according to the invention.

Next, a method of mounting the indicator in the electronic device according to the invention is described with a flowchart shown in FIG. 2. The indicator 5 is mounted by performing the following first to fourth steps.

In the first step, the insertion hole 31 is formed by penetrating the panel 3, and when the burring portion 32 is provided, burring is performed for the insertion hole 31. It should be noted that it is preferable that a plurality of insertion holes 31 are formed at the same time in the first step to reduce the number of steps, resulting in reduced processing cost. Further, it is more preferable to form the insertion holes 31 concurrently with mounting holes for mounting other components such as the above-described controls 8.

In the second step, on the circuit board 4 provided on the rear side of the panel 3, the light emitting unit 10 is placed in such a manner that the light emitting portion 11 faces the insertion hole 31 at a position apart from the insertion hole 31 by a predetermined length, and the terminals 12 and 13 are inserted into the through holes 41 of the circuit board 4 and soldered.

In the third step, the light transmitting elastic body, which has been formed to have a uniform shape of a cross section perpendicular to its axial direction, is cut in the predetermined length L1 along the cross section perpendicular to the axial direction to form the light guide chip 14. The light transmitting elastic body in use is a long (for example, a rope-shaped) one that has been manufactured by extrusion molding using a soft and elastic resin such as vinyl chloride.

Incidentally, the cross sectional shape of the above light transmitting elastic body is made to closely match with and slightly larger than the shape of the insertion hole 31, thereby facilitating attachment of the light transmitting elastic body into the insertion hole 31. In this case, when the insertion hole 31 is, for example, a circular hole, an elliptical hole, and a polygonal (triangular or more) hole, the light guide chip 14 should be an almost cylindrical column, an almost elliptical column, and an almost. polygonal column, respectively.

In the fourth step, a work of pressing the light guide chip 14, formed in the third step, into the insertion hole 31 from the front side of the panel 3, is performed. The light guide chip 14 is held in pressure contact with the inner peripheral surface of the insertion hole 31 without bonding with an adhesive or the like, and therefore never mars the appearance of the electronic device due to the adhesive running over. Incidentally, the pressing work automated through use of a robot arm reduces the number of processes, resulting in reduced cost.

The indicator 5 can be mounted in the electronic device by performing the first to fourth steps in the order of the first, second, third, and fourth steps as shown in the flowchart in FIG. 2. The order of performing the steps, however, is not limited to this, but the above-described steps may be performed in any step order of the following (1) to (5):

(1) an order of the first, second, third, and fourth steps (the step order shown in FIG. 2),
(2) an order of the first, third, second, and fourth steps,
(3) an order of the first, third, fourth, and second steps,
(4) an order of the third, first, second, and fourth steps, and
(5) an order of the third, first, fourth, and second steps.

Figure 3:
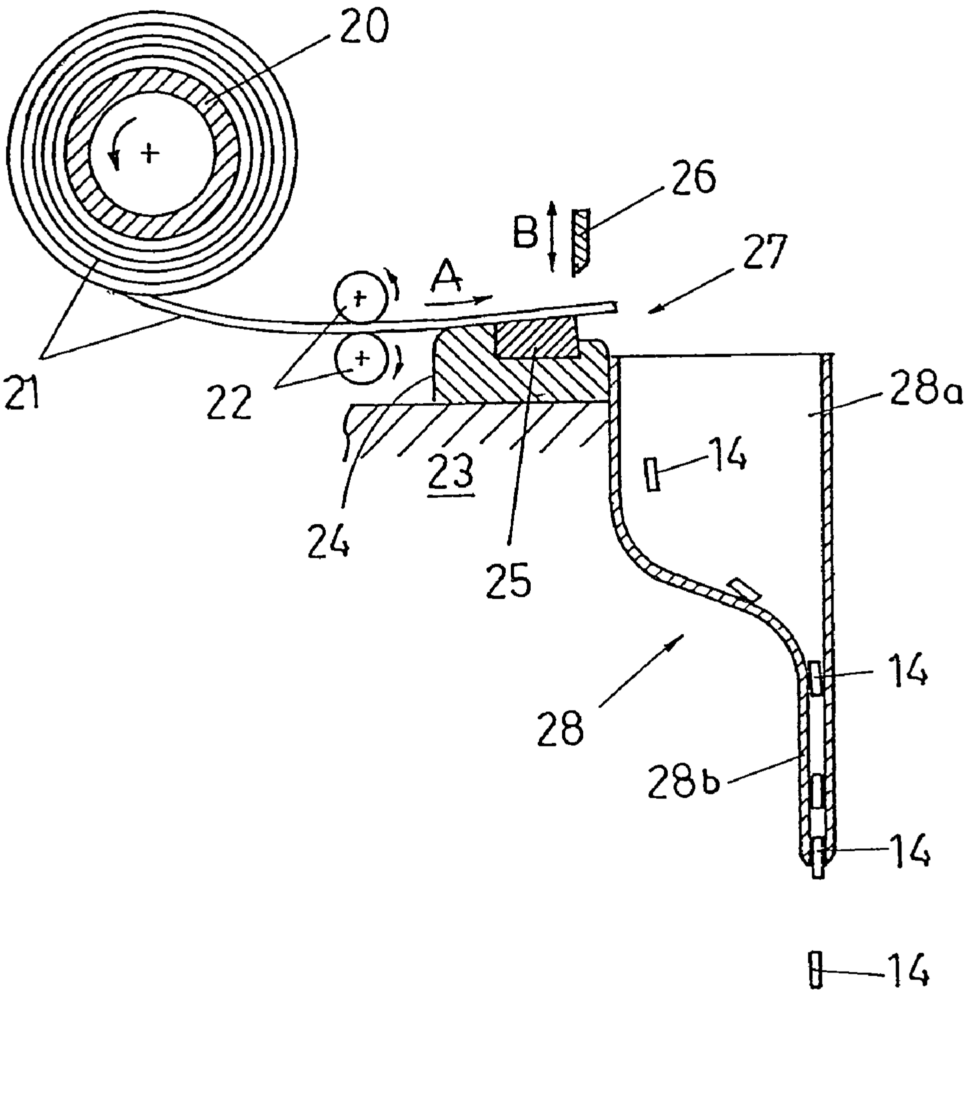
FIG. 3 is an explanatory view for explaining a specific example of a third step in FIG. 2.

Here, the above-described third step is described more specifically using FIG. 3.

In advance, a long light transmitting elastic body having a uniform shape of a cross section (a diameter is fixed in a circular cross section, but a square cross section is also applicable) perpendicular to the axial direction is manufactured by extrusion molding using a transparent elastic resin material such as vinyl chloride or the like, and wound, like a tube or rope, around a core 20 as shown in FIG. 3 into a roll shape.

In the third step, the core 20 of the roll is fit on a not-shown shaft and supported to be rotatable in a direction shown by an arrow, and an end portion of a wound long light transmitting elastic body 21 is drawn out and held between a carrier roller pair 22. Then, the carrier roller pair 22 is rotated in the direction shown by the arrow to send the long light transmitting elastic body 21 out in a direction shown by an arrow A. There are a fixed blade 25 held on a fixed blade holder 24 fixed on a base 23 and a movable blade 26 placed thereabove to be movable upward and downward in a direction shown by an arrow B by means of a not-shown drive mechanism, thus constituting a cutter 27. Further, a parts feeder 28 is placed adjacent to and below the cutter 27.

The light transmitting elastic body 21 is stopped at a position where it projects from a cutting edge (an edge on the upper right side in FIG. 3) of the fixed blade 25 by the above-described length of the light guide chip 14, and the movable blade 26 is lowered to cut the light transmitting elastic body 21 by a shearing force thereof with the fixed blade 25. This makes it possible to cut the light transmitting elastic body 21 in the predetermined length along the cross section perpendicular to the axial direction to produce the light guide chip 14 in a chip form.

The cut light guide chips 14 fall into a hopper portion **28*a* of the parts feeder 28, and are led to a pipe-shaped send-out portion 28*b* by vibrations of the hopper portion 28*a* into a line in the axial direction and sent out one by one. They can be grasped by a robot arm or the like and pressed into the above-described insertion holes 31 of the panel 3**.

To cut the light transmitting elastic body 21 in succession in a fixed length to successively produce many light guide chips 14 with the fixed length, it is only required to cut the light transmitting elastic body 21 at a position where it slightly projects from the fixed blade 25 and dump the cut piece at the first time, and thereafter to repeat the action of sending out the light transmitting elastic body 21 by a fixed amount in the direction shown by the arrow A by means of the carrier roller pair 22, stopping it, and then lowering the movable blade of the cutter 27 to cut it. In this case, by changing the sending amount by the carrier roller pair 22, the length of the light guide chip 14 to be produced can be changed.

Alternatively, it is also adoptable to place a sensor such as a photosensor at a position where the tip of the light transmitting elastic body 21 is stopped, so that the carrier roller pair 22 is stopped when the sensor detects the tip of the light transmitting elastic body 21. In this case, the length of the light guide chip 14 to be produced can be changed by moving the mounting position of the sensor.

Besides, although the illustration is omitted, a movable guide for guiding the carriage direction of the light transmitting elastic body 21 on the fixed blade 25 is provided to guide and send out the light transmitting elastic body 21 in a direction perpendicular to the cutting edge of the fixed blade 25, thereby making it possible to cut the light transmitting elastic body 21 along the cross section perpendicular to the axial direction thereof as described above.

Further, the guide is slightly inclined to send out the light transmitting elastic body 21 obliquely to the direction perpendicular to the cutting edge of the fixed blade 25, thereby making it possible to produce a cut surface oblique to the direction perpendicular to the axial direction like a later-described light guide chip used in a second embodiment. When one end surface of the light guide chip is made oblique and the other end surface is made perpendicular to the axial direction, it is only required to turn the guide between a position oblique thereto and a position aligned therewith at every cutting so as to cut along a perpendicular cross section and an oblique cross section alternately.

If advantage of curl of the light transmitting elastic body 21 is taken, or it is more firmly curved and cut as it is kept curved, a curved light guide chip as is used in a later-described third embodiment can be easily produced.

According to the above-described embodiment, since it is unnecessary to align, through fine adjustment, the position of the light guide chip 14 with the position of the light emitting unit 10, many indicators 5 can easily be mounted on the panel 3 with sufficient mounting accuracy without depending on assembly with high accuracy, and since no adhesive is in use, there is no possibility of marring the appearance of the electronic device due to the adhesive running over.

Further, no mold is required to form the light guide chip 14, and light guide chips 14 with various lengths in accordance with the space between the panel 3 and circuit board 4 can be produced only by changing the interval (the length L1) of cutting the light transmitting elastic body, so that the cost can be greatly reduced.

Further, since mounting components such as a positioning guide and the like are not necessary, the indicator has the less number of components and a simple structure, and its mounting steps are easy to perform. Moreover, the mounting work can be automated using a robot arm or the like.

Figure 4:
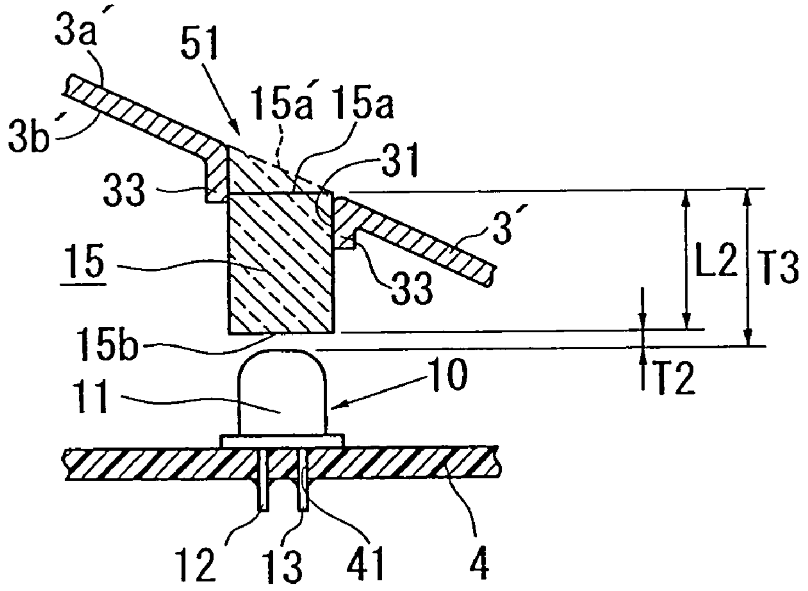
FIG. 4 is a cross-sectional view of a panel structure and an indicator mounting portion similar to FIG. 1, showing a second embodiment of the invention.

Next, a second embodiment of the invention is described. FIG. 4 is a cross-sectional view of a panel structure and an indicator mounting portion similar to FIG. 1, showing a second embodiment of the invention, and therefore the same numerals are assigned to the same portions as those in FIG. 1 to omit the descriptions thereof.

This embodiment shows a case where an indicator 51 composed of a light emitting unit 10 and a light guide chip 15 is mounted in such a state that a circuit board 4 and a panel 3' are not parallel to each other, and an insertion hole 31 and the light emitting unit 10 are not opposed to each other in a direction perpendicular to the surface of the panel 3' (directly opposed). This case occurs when the circuit board 4 is placed parallel to the bottom surface of the case 2 in the mixer 1 shown in FIG. 7.

Burring of the insertion hole 31 for the panel 3' of FIG. 4 is performed not in the direction perpendicular to the panel 3' but in the direction perpendicular to the circuit board 4 so that the direction in which a burring portion 33 to be formed falls points to the light emitting unit 10. Therefore, the light guide chip 15, which is in pressure contact with and held by an inner peripheral wall surface of the burring portion 33 forming the insertion hole 31, is fixed obliquely to a front surface 3*a*' of the panel 3' such that the light guide chip 15 is opposed to the light emitting unit 10.

Besides, the light guide chip 15 is almost the same as the light guide chip 14 shown in FIG. 1, but in order to prevent one end surface 15*a* shown by a solid line in FIG. 4 from projecting from the front surface 3*a*' of the panel 3', its length L2 is preferably set to a length shorter than a distance T3 from the lowest position of the insertion hole 31 to the upper end of the light emitting unit 10 by the same clearance T2 as in the first embodiment (L2=T3−T2).

This arrangement enables a lower end surface 15*b* of the light guide chip 15 pressed into the insertion hole 31 to be directly opposed to the light emitting portion 11 of the light emitting unit 10 even if the panel 3' is not parallel to the circuit board 4, and therefore the light guide chip 15 can efficiently conduct light emitted by the light emitting portion 11 from the lower end surface 15*b* thereof to the upper end surface 15*a* exposed to the front surface 3*a*' of the panel 3' so that lighting/non-lighting of the indicator 51 can be clearly viewed.

It should be noted that although a method of mounting the indicator 51 is almost the same as the above-described mounting method of the indicator 5, the burring to be performed for the insertion hole 31 in the first step is performed in the direction oblique to the front surface 3*a*' of the panel 3' and perpendicular to the circuit board 4.

Incidentally, it is also adoptable to obliquely cut the upper end (one end) surface of the light guide chip 15 in the third step as shown by a broken line in FIG. 4, and press the light guide chip 15 into the insertion hole 31 in the fourth step such that the upper end surface 15*a*' being the oblique surface is aligned with the front surface 3*a*' of the panel 3'. This arrangement can eliminate a difference in level between the front surface 3*a*' of the panel 3' and the upper end surface of the light guide chip 15 for improved appearance. In addition, since the upper end surface 15*a*' of the light guide chip 15 points to the operator (on the right side in FIG. 4), the operator can more easily view lighting/non-lighting of the indicator 51.

Figure 5:
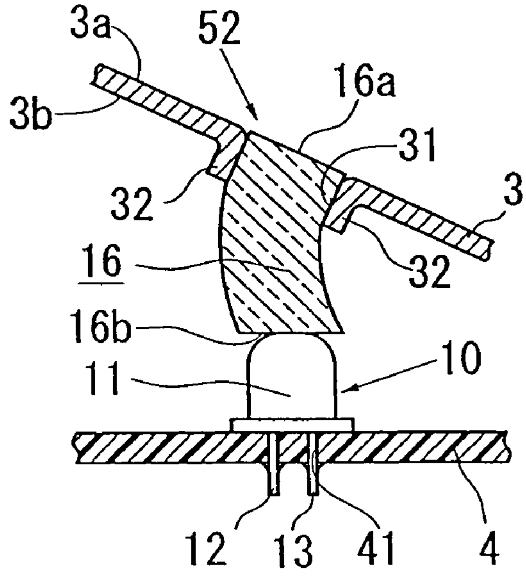
FIG. 5 is a cross-sectional view of a panel structure and an indicator mounting portion similar to FIG. 1 and FIG. 4, showing a third embodiment of the invention.

Next, a third embodiment being another embodiment wherein the insertion hole 31 and the light emitting unit 10 are not directly opposed to each other is described. FIG. 5 is a cross-sectional view of a panel structure and an indicator mounting portion similar to FIG. 1 and FIG. 4, and therefore the same numerals are assigned to the same portions as those in FIG. 1 and FIG. 4 to omit the descriptions thereof.

In this embodiment, a panel 3 shown in FIG. 1 is provided obliquely to a circuit board 4, and therefore the direction in which a burring portion 32 falls does not point to a light emitting unit 10 but is perpendicular to the surface of the panel 3.

On the other hand, a light guide chip 16 to be in pressure contact with an inner peripheral surface of the burring portion 32 forming the insertion hole 31 is curved in its axial direction. Therefore, it is possible to pass the light guide chip 16 through the insertion hole 31 and expose an upper end surface 16*a* thereof to be aligned with a front surface 3*a* of the panel 3 as well as to allow a lower end surface 16*b* to be directly opposed to the light emitting portion 11. Accordingly, light emitted by the light emitting portion 11 is efficiently conducted to the upper end surface 16*a* exposed to the front surface 3*a* side of the panel 3 through the light guide chip 16.

It should be noted that the light guide chip 16 is composed of a light transmitting elastic body and therefore has elasticity, so that the degree of curve thereof changes to some degree by applying pressure thereto. Accordingly, processing errors such as a cutting error of the light guide chip 16 and a mounting error of the light emitting unit 10 can be absorbed by the curve of the light guide chip 16, which eliminates a necessity of consideration of the above-described clearance T2. Consequently, the light guide chip 16 may be mounted with its lower end surface 16*b* abutting against the light emitting portion 11 or somewhat pressed thereto.

Although a method of mounting the indicator 52 is almost the same as the above-described mounting method of the indicator 5, a work of curving the light guide chip 16 is additionally performed in the third step. However, if a long light transmitting elastic body 21 has been wound around a core 20 in advance to have curl as shown in FIG. 3, a curved light guide chip 16 can be obtained only by cutting it.

The examples in which the indicators 51 and 52 are mounted when the circuit boards 4 are horizontal and the panels 3 and 3' are inclined are described with FIG. 4 and FIG. 5. The invention, however, is not limited to these, but the indicator can be mounted in the same manner also when the panel is horizontal and the circuit board is inclined.

Figure 6:
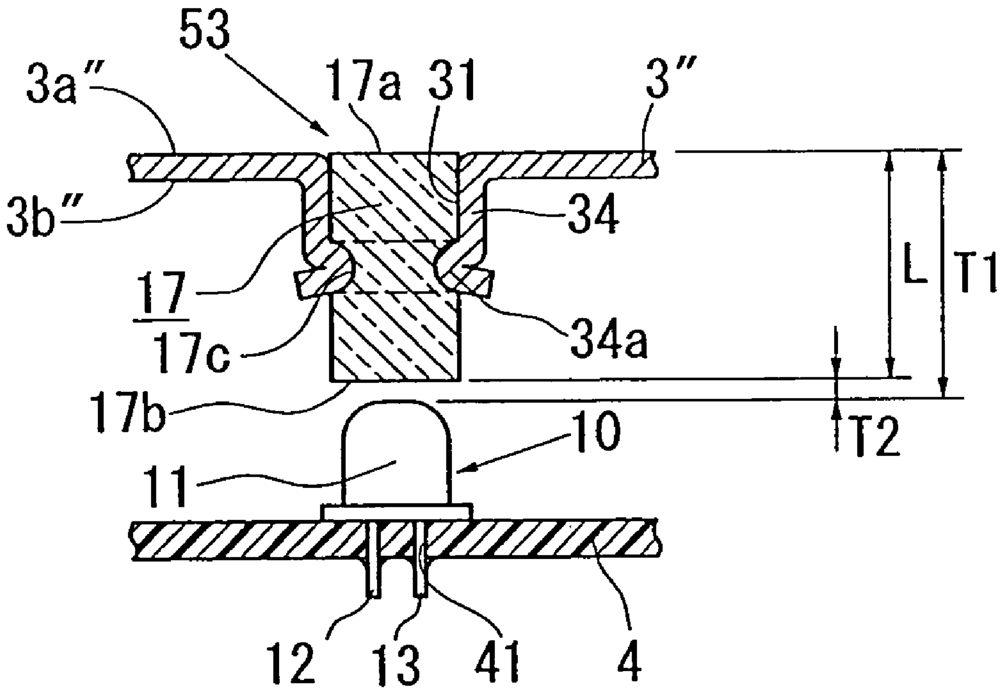
FIG. 6 is a cross-sectional view of a panel structure and an indicator mounting portion similar to FIG. 1, FIG. 4, and FIG. 5, showing a fourth embodiment of the invention.

Next, a fourth embodiment of the invention is described with FIG. 6. FIG. 6 is a cross-sectional view of a panel structure and an indicator mounting portion similar to FIG. 1, FIG. 4, and FIG. 5, and therefore the same numerals are assigned to the same portions as those in these drawings to omit the descriptions thereof.

In this embodiment, a burring portion 34 provided with an annular projecting portion 34*a* which projects from its inner peripheral surface into an insertion hole 31 of a panel 3" is formed by burring, and an annular groove 17*c* which fits with the projecting portion 34*a* is provided on an outer periphery of a light guide chip 17.

Therefore, when the light guide chip 17 is pressed into the insertion hole 31, its outer peripheral surface is brought into pressure contact with the inner peripheral surface of the burring 34, and the projecting portion 34*a* fits with the groove 17*c*, thereby creating more firm fixation.

The shapes of the projecting portion 34*a* and groove 17*c* are not limited to those shown in FIG. 6, but may have any shapes as long as they fit with each other. For example, a plurality of small projections may be formed on the inner peripheral surface of the burring 34. Since the light guide chip 17 has elasticity, it somewhat transforms by pressure to be able to fit with the projections even if grooves are not necessarily provided. Further, it is also adoptable to provide a recessed portion in the burring portion 34, and provide a projecting portion on the outer periphery of the light guide chip 17 or transform it, thereby inserting the light guide chip 17 into the recessed portion.

It should be noted that the projecting portion 34*a* which is provided in the burring portion 34 is preferably processed concurrently with performance of the burring.

Further, while the insertion hole 31 and light emitting unit 10 are directly opposed to each other in the embodiment shown in FIG. 6, the invention is not limited to this, but the projecting portion and groove can be similarly provided also when the insertion hole 31 and light emitting unit 10 are not directly opposed to each other as in the embodiments shown in FIG. 4 and FIG. 5.

In any of the above-described first to fourth embodiments, burring is performed for the insertion hole. Thereby, when the burring portion is provided, the area where the light guide chip and panel are in contact is increased, leading to an advantage that the light guide chip can be stably fixed even when the panel is thin. The burring portion, however, is not essential in the invention. For example, when the panel is large in thickness, the light guide chip may be held by the inner peripheral surface of an insertion hole for which no burring is performed. In this case, the panel is not limited to a panel made of a sheet metal, but a panel made of resin can also be used.

Further, in any of the above-described first to fourth embodiments, no positioning guide is required. However, the positioning guide may be provided on the circuit board when an increase in mounting accuracy is especially desired such as when small-sized indicators are mounted in an electronic device with very high density.

Incidentally, the color of the light guide of the indicator is not limited to transparent and colorless, but a transparent and colored or translucent light guide which is composed of a light transmitting elastic body using a light transmitting coloring agent may be used. In this case, the display color can be easily changed without changing the color of light emitted by the light emitting unit.

Further, the light emitting unit is not limited to LED, but other light emitting units such as a minilamp and the like may be used. Furthermore, what the light emitting unit is mounted on is not limited to the circuit board, but it may be mounted, for example, on the bottom plate of the case or other supporting members.

Besides, while the embodiments in which the invention is applied to the mixer shown in FIG. 7 are described, the invention can be similarly applied also to various kinds of electronic devices provided with light emitting indicators, for example, various kinds of audio or video devices, electronic musical instruments, home appliance, information equipment, office equipment, commercial equipment, medical equipment, and so on.

As has been described, with the electronic device, panel structure thereof, and a method of mounting the indicator therein according to the invention, the structure of the indicator can be simplified. Further, since its light guide is pressed into and fixed to the insertion hole formed in the panel, an adhesive is unnecessary to mount it, eliminating a possibility of marring the appearance of the electronic device. In addition, mounting steps are easy, so that many indicators can be easily mounted with sufficient mounting accuracy without positioning guides.

Moreover, since the light guide can be produced by cutting the light transmitting elastic body having a uniform cross section, no mold is required, and a light guide in accordance with the space and angle between the panel and circuit board can be easily produced only by changing the cutting interval and cutting angle, so that the manufacturing cost can be greatly reduced.

What is claimed is:

1. An electronic device comprising an indicator, including:

a panel on which said indicator is mounted; and an insertion hole formed through said panel by performing burring for said panel from the front surface side thereof to the rear surface side, said insertion hole being surrounded by a burring portion formed by said burring, the burring portion providing an increased contact area of the insertion hole, a rounded edge being formed between the front surface of said panel and said burring portion;

said indicator comprising a light guide with one end surface exposed to a front surface side of said panel and another end surface projecting to a rear surface side of said panel, through said insertion hole, and a light emitting unit positioned on the rear surface side of said panel such that a light emitting portion thereof is opposed to the other end surface of said light guide, and said light guide is composed of a light transmitting elastic body having a uniform cross section, transforms when pressed into said insertion hole, and is fixed by an outer peripheral surface thereof near the one end surface being in pressure contact with an inner peripheral surface of said insertion hole.

2. An electronic device according to claim 1 wherein the length of said light guide is set shorter than a distance from the front surface of said panel to a top portion of said light emitting unit by a clearance for preventing said light guide from abutting against said light emitting unit.

3. An electronic device according to claim 2, wherein the end surface of said light guide on the front surface side of said panel is a rough surface.

4. An electronic device according to claim 1, wherein the end surface of said light guide on the front surface side of said panel is a rough surface.

5. A method of mounting an indicator in an electronic device, comprising:

a first step of forming an insertion hole through a panel of the electronic device by performing burring from the front surface side thereof to the rear surface side as said insertion hole having a contact area increased by the performance of the burring, a rounded edge being formed between the front surface of said panel and said burring portion;

a second step of placing a light emitting unit at a position apart from the insertion hole on a rear surface side of the panel by a predetermined length such that a light emitting portion thereof is opposed to the insertion hole;

a third step of cutting a light transmitting elastic body, which is formed to have a uniform shape of a cross section perpendicular to an axial direction thereof, in a predetermined length along a cross section perpendicular or oblique to the axial direction to form a light guide chip; and a fourth step of pressing the light guide chip into the insertion hole from the front surface side of the panel, thereby causing the light guide chip to transform and be held in pressure contact with the inner peripheral surface of the insertion hole, wherein said steps are performed in any step order of (1) to (5):

(1) an order of said first, second, third, and fourth steps, (2) an order of said first, third, second, and fourth steps, (3) an order of said first, third, fourth, and second steps, (4) an order of said third, first, second, and fourth steps, and (5) an order of said third, first, fourth, and second steps.

6. A method of mounting an indicator in an electronic device according to claim 5, wherein:

at least one of the end surfaces of said light guide chip is formed into a rough surface in said third step; and said light guide chip is pressed into said insertion hole such that the end surface formed into the rough surface is exposed to the front surface side of said panel in said fourth step.

7. A panel structure of an electronic device, comprising an insertion hole formed through a panel of the electronic device by performing burring for said panel from the front surface side thereof to the rear surface side, said insertion hole being surrounded by a burring portion formed by said burring. the burring portion providing an increased contact area of the insertion hole, a rounded edge being formed between the front surface of said panel and said burring portion;

a light emitting unit positioned on a rear surface side of said panel at a position apart from said insertion hole by a predetermined length such that a light emitting portion thereof is opposed to said insertion hole;

a light guide composed of a light transmitting elastic body, formed to have a uniform shape of a cross section perpendicular to an axial direction thereof, being pressed into said insertion hole from a front surface side of said panel and transformed and frictionally held by said insertion hole; and wherein said light guide is made by cutting a light transmitting elastic body in a predetermined length along a cross section perpendicular or oblique to the axial direction into a chip form.

8. A panel structure of an electronic device according to claim 7, wherein the length of said light guide is set shorter than a distance from the front surface of said panel to a top portion of said light emitting unit by a clearance for preventing said light guide from abutting against said light emitting unit.

9. A panel structure of electronic device according to claim 8, wherein the clearance has a dimension which absorbs a cutting error occurring when the long light transmitting elastic body is cut in the predetermined length to be formed into said chip form.

10. A panel structure of electronic device according to claim 9, wherein the end surface of said light guide on the front surface side of said panel is formed into a rough surface.

11. A panel structure of electronic device according to claim 8, wherein the end surface of said light guide on the front surface side of said panel is formed into a rough surface.

12. A panel structure of electronic device according to claim 7, wherein the end surface of said light guide on the front surface side of said panel is formed into a rough surface.

13. A panel structure of electronic device according to claim 9, wherein: said insertion hole is a hole formed of the inner wall of a cylindrical flange connected to said panel, and holds said light guide with said inner wall of the insertion hole.

* * * * *

UNITED STATES PATENT AND TRADEMARK OFFICE
CERTIFICATE OF CORRECTION

PATENT NO. : 7,455,440 B2
APPLICATION NO. : 10/663861
DATED : November 25, 2008
INVENTOR(S) : Kazuhiko Nishizawa It is certified that error appears in the above-identified patent and that said Letters Patent is hereby corrected as shown below:

In column 14, line 20, please replace "according to claim 9" with

--according to claim 7--

Signed and Sealed this

Twenty-fourth Day of March, 2009

JOHN DOLL
*Acting Director of the United States Patent and Trademark Office*